(12) United States Patent
Van Vleck et al.

(10) Patent No.: US 8,624,713 B2
(45) Date of Patent: Jan. 7, 2014

(54) PROGRAMMING A UNIVERSAL REMOTE CONTROL VIA PHYSICAL CONNECTION

(75) Inventors: Paul Van Vleck, Austin, TX (US); Gregory Edwards, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 797 days.

(21) Appl. No.: 12/539,288

(22) Filed: Aug. 11, 2009

(65) Prior Publication Data
US 2011/0037635 A1    Feb. 17, 2011

(51) Int. Cl.
*H04L 17/02* (2006.01)

(52) U.S. Cl.
USPC ...................... 340/12.25; 340/12.28; 341/176

(58) Field of Classification Search
USPC .................. 341/176; 340/12.22, 12.23, 12.25, 340/12.26, 12.28
See application file for complete search history.

(56) References Cited

U.S. PATENT DOCUMENTS

| | | | |
|---|---|---|---|
| 5,228,077 | A | 7/1993 | Darbee |
| 5,255,313 | A | 10/1993 | Darbee |
| 5,410,326 | A | 4/1995 | Goldstein |
| 5,455,570 | A * | 10/1995 | Cook et al. ................. 340/3.71 |
| 6,008,735 | A | 12/1999 | Chiloyan et al. |
| 6,133,847 | A * | 10/2000 | Yang ........................... 340/4.32 |
| 6,157,319 | A * | 12/2000 | Johns et al. ................ 340/12.24 |
| 6,507,306 | B1 | 1/2003 | Griesau et al. |
| 6,650,248 | B1 | 11/2003 | O'Donnell et al. |
| 6,735,287 | B2 | 5/2004 | Vishik et al. |
| 6,791,449 | B2 * | 9/2004 | Dewan ......................... 340/5.25 |
| 7,046,185 | B2 | 5/2006 | Griesau et al. |
| 7,065,184 | B2 | 6/2006 | Vishik et al. |
| 7,106,209 | B2 | 9/2006 | Mui |
| 7,116,264 | B2 | 10/2006 | Griesau et al. |
| 7,154,566 | B2 | 12/2006 | Gustafson et al. |
| 7,170,422 | B2 | 1/2007 | Nelson et al. |
| 7,218,243 | B2 * | 5/2007 | Hayes et al. ................ 340/12.25 |
| 7,224,903 | B2 | 5/2007 | Colmenarez et al. |
| 7,272,145 | B2 | 9/2007 | Chen et al. |
| D562,806 | S | 2/2008 | Bruce et al. |
| 7,415,502 | B2 | 8/2008 | Vishik et al. |
| 7,568,149 | B2 | 7/2009 | Edwards et al. |
| D603,842 | S | 11/2009 | Bruce et al. |
| 7,630,478 | B2 | 12/2009 | Vishik et al. |
| 7,668,889 | B2 | 2/2010 | Edwards et al. |
| 7,671,758 | B1 | 3/2010 | Seidel et al. |
| 7,746,884 | B2 | 6/2010 | Van Vleck et al. |
| RE41,453 | E | 7/2010 | Wall et al. |
| 7,778,263 | B2 | 8/2010 | Chen et al. |
| 7,860,962 | B2 | 12/2010 | White et al. |
| 7,873,102 | B2 | 1/2011 | Van Vleck et al. |
| 7,949,105 | B2 | 5/2011 | Vishik et al. |
| 2001/0035811 | A1 * | 11/2001 | Dewan ......................... 340/5.25 |
| 2003/0095641 | A1 | 5/2003 | Vishik et al. |
| 2003/0097413 | A1 | 5/2003 | Vishik et al. |
| 2004/0010602 | A1 | 1/2004 | Van Vleck et al. |
| 2004/0022247 | A1 | 2/2004 | Chen et al. |
| 2004/0208588 | A1 | 10/2004 | Colmenarez et al. |
| 2004/0247089 | A1 | 12/2004 | Vishik et al. |

(Continued)

*Primary Examiner* — Howard Williams
(74) *Attorney, Agent, or Firm* — Jackson Walker L.L.P.

(57) ABSTRACT

A method and system for programming a universal remote control (URC) to operate with a remote-controlled device is disclosed. A connection to the remote-controlled device may be established. In response, the remote-controlled device may send device information. The device information may include programming codes for programming the URC to control the remote-controlled device. The device information may also be used to query a server to obtain the programming codes.

18 Claims, 6 Drawing Sheets

(56) References Cited

U.S. PATENT DOCUMENTS

| | | |
|---|---|---|
| 2006/0084409 A1* | 4/2006 | Ghadiali ..................... 455/352 |
| 2006/0203973 A1 | 9/2006 | Vishik et al. |
| 2006/0251094 A1 | 11/2006 | Van Vleck et al. |
| 2006/0259184 A1* | 11/2006 | Hayes et al. .................. 700/221 |
| 2007/0025449 A1 | 2/2007 | Van Vleck et al. |
| 2007/0038773 A1 | 2/2007 | White et al. |
| 2007/0130588 A1 | 6/2007 | Edwards et al. |
| 2007/0294737 A1 | 12/2007 | Edwards et al. |
| 2008/0019386 A1 | 1/2008 | Chen et al. |
| 2008/0165283 A1 | 7/2008 | Brandt et al. |
| 2008/0189736 A1 | 8/2008 | Edwards et al. |
| 2008/0235745 A1 | 9/2008 | Edwards et al. |
| 2008/0250468 A1 | 10/2008 | Sullivan et al. |
| 2009/0019542 A1 | 1/2009 | Vishik et al. |
| 2009/0025025 A1 | 1/2009 | Van Vleck |
| 2009/0040091 A1* | 2/2009 | Carlson et al. ................ 341/176 |
| 2009/0132355 A1 | 5/2009 | Begeja et al. |
| 2009/0158369 A1 | 6/2009 | Van Vleck |
| 2009/0167855 A1* | 7/2009 | Kummer ...................... 348/114 |
| 2009/0244403 A1* | 10/2009 | Beals ........................... 348/734 |
| 2009/0322583 A1* | 12/2009 | Reams et al. ................. 341/176 |
| 2010/0041374 A1 | 2/2010 | Vishik et al. |
| 2010/0057575 A1 | 3/2010 | Begeja et al. |
| 2010/0058381 A1 | 3/2010 | Begeja et al. |
| 2010/0063863 A1 | 3/2010 | Begeja et al. |
| 2010/0122285 A1 | 5/2010 | Begeja et al. |
| 2010/0122286 A1 | 5/2010 | Begeja et al. |
| 2010/0125586 A1 | 5/2010 | Van Vleck et al. |
| 2010/0145766 A1 | 6/2010 | Begeja et al. |
| 2010/0223549 A1 | 9/2010 | Edwards |
| 2011/0037574 A1 | 2/2011 | Pratt et al. |
| 2011/0037611 A1 | 2/2011 | Van Vleck et al. |
| 2011/0037637 A1 | 2/2011 | Van Vleck et al. |
| 2011/0047284 A1 | 2/2011 | White et al. |
| 2011/0075727 A1 | 3/2011 | Van Vleck et al. |
| 2011/0090085 A1 | 4/2011 | Belz et al. |
| 2011/0093876 A1 | 4/2011 | Belz et al. |
| 2011/0093908 A1 | 4/2011 | Van Vleck et al. |
| 2011/0109444 A1 | 5/2011 | Edwards et al. |
| 2011/0115664 A1 | 5/2011 | Belz et al. |
| 2011/0131600 A1 | 6/2011 | Howcroft et al. |
| 2011/0131605 A1 | 6/2011 | Pratt et al. |
| 2011/0289113 A1* | 11/2011 | Arling et al. .................. 707/769 |
| 2012/0328300 A1* | 12/2012 | Reams .......................... 398/106 |

\* cited by examiner

PROGRAMMING A UNIVERSAL REMOTE CONTROL VIA PHYSICAL CONNECTION

BACKGROUND

1. Field of the Disclosure

The present disclosure relates to remote-controlled devices and, more particularly, to programming universal remote-controlled devices.

2. Description of the Related Art

Remote-controlled devices provide convenient operation of equipment from a distance. Many consumer electronic devices are equipped with remote control features. Universal remote-controlled devices, may be configured to control different pieces of equipment.

DESCRIPTION OF THE EXEMPLARY EMBODIMENTS

Figure 1:
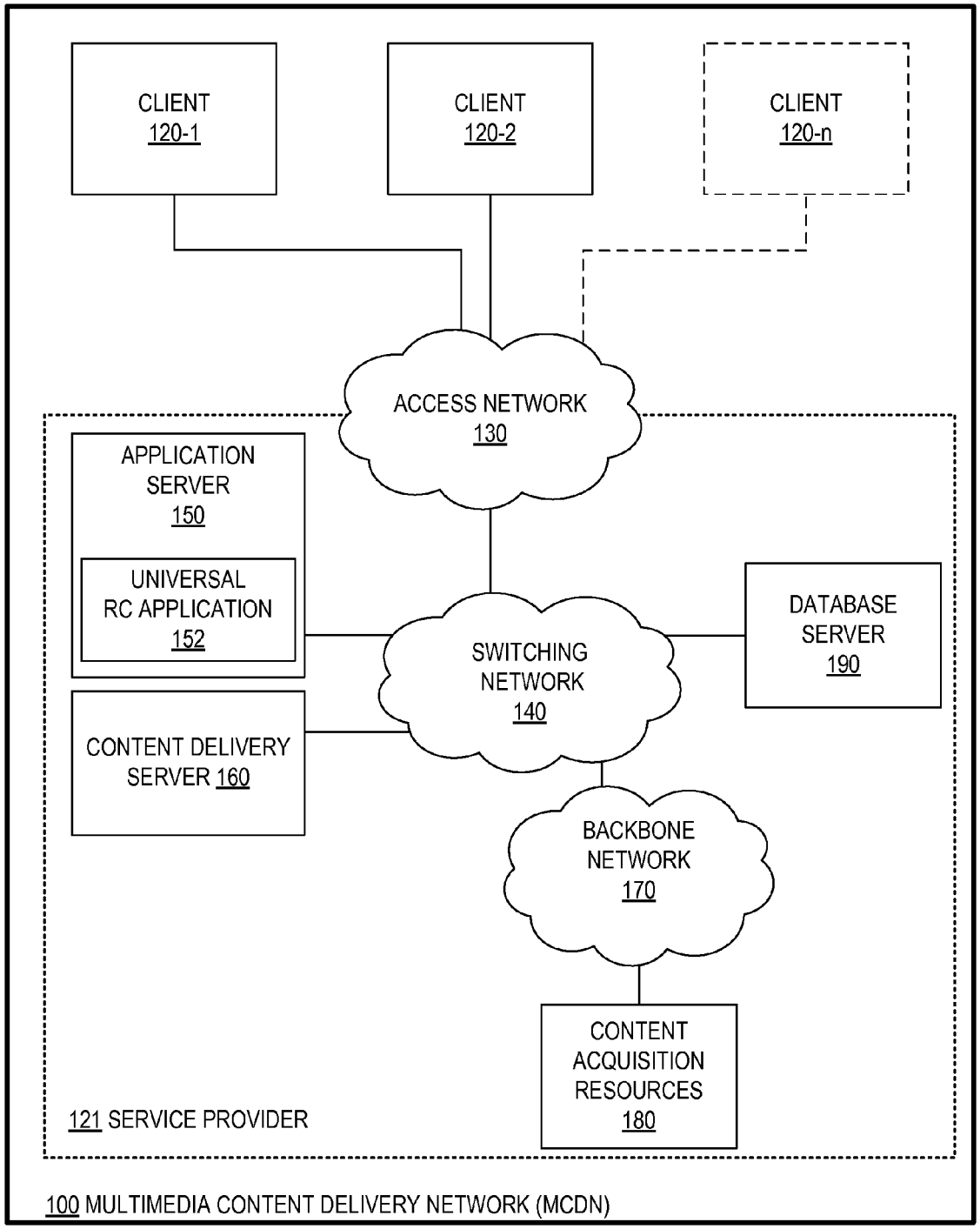
FIG. 1 is a block diagram of selected elements of an embodiment of a multimedia distribution network.

In one aspect, a disclosed method for configuring a universal remote control (URC) includes receiving device information from the remote-controlled device in response to establishing a connection with a remote-controlled device, and based on the device information, programming the URC via a wireless communication link to control the remote-controlled device. The device information may include programming codes for the remote-controlled device. The device information may include an identifier for the remote-controlled device.

In particular embodiments, the method further includes sending a request to a server for programming codes for the remote-controlled device, the request including the identifier. In response to the request, the method may include receiving programming codes from the server. The server may be included in a multimedia content distribution network (MCDN).

In certain embodiments, the method still further includes displaying a confirmation indicating that the URC has been successfully configured with at least one programming code for the remote-controlled device. In various embodiments, the method also includes receiving, from the URC, a device command, and causing the remote-controlled device to execute the device command by communicating with the remote-controlled device via the connection. The device command may be associated with at least one of the programming codes.

In a further aspect, disclosed customer premises equipment (CPE) for use within a client configuration of an MCDN includes a processor, a local transceiver, a device interface, and memory media accessible to the processor, including instructions executable by the processor. The processor executable instructions may be executable to establish a connection with a remote-controlled device via the device interface. In response to establishing the connection, the processor executable instructions may further be executable to receive, via the device interface, device information from the remote-controlled device. Responsive to receiving the device information, the processor executable instructions may still further be executable to program, via the local transceiver, a URC to control the remote-controlled device.

In certain embodiments, the CPE further includes processor executable instructions executable to receive programming codes for the remote-controlled device from the MCDN server in response to sending a request including the device information to an MCDN server, and use the programming codes to program the URC. The local transceiver may be a wireless transceiver. The device interface may be a compact digital audio and video local bus interface, including at least one bidirectional control channel. The device information may include programming codes for the remote-controlled device, while the CPE further comprises programming instructions executable to use the programming codes to program the URC. The CPE may still further include processor executable instructions executable to receive, at the local transceiver, a device command from the URC, and cause the remote-controlled device to execute the device command by communicating with the remote-controlled device via the device interface.

In yet another aspect, a disclosed computer-readable memory media includes executable instructions for configuring a URC. The instructions may be executable to detect a connection to a remote-controlled device via a local bus interface, and instruct the remote-controlled device to transmit device information via the local bus interface. Responsive to receiving the device information via the local bus interface, the instructions may further be executable to program the URC to control the remote-controlled device.

In various embodiments, the instructions may further be executable to send a request to a server for programming codes, the request including the device information, receive programming codes from the server, while said instructions executable to program the URC may further include instructions executable to use the programming codes for programming the URC. The instructions may further be executable to obtain programming codes included with the device information. The instructions may still further be executable to cause the remote-controlled device to execute the instruction by communicating with the remote-controlled device via the local bus interface, while the received instruction may be associated with at least one programming code used to program the URC. The local bus interface may include at least one bidirectional control channel. The local bus interface may be a compact digital audio and video interface.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscribe line (DSL) compliant twisted pair connections between clients 120 and a node (not depicted) in access network 130 while fiber, cable or another broadband medium connects service provider 121 resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include URC application 152, which, as will be described in detail below, mat be configured to cause client 120 of MCDN 100 to reprogram a URC device.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote-controlled devices, and programming codes for URCs.

Figure 2:
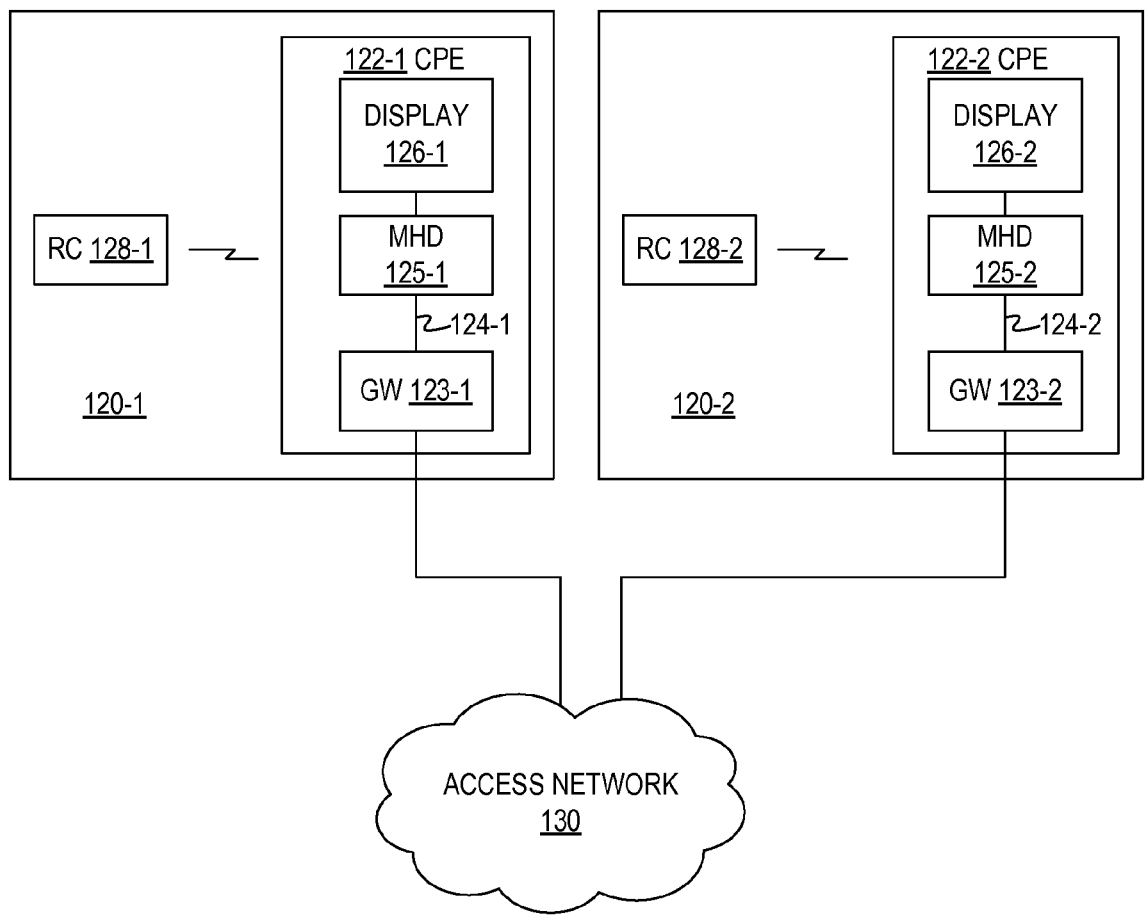
FIG. 2 is a block diagram of selected elements of an embodiment of a multimedia distribution network.

Turning now to FIG. 2, clients 120 are shown in additional detail with respect to access network 130. Clients 120 may include, network appliances collectively referred to herein as CPE 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for clients 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125.

In some embodiments, remote control 128 may represent a URC device that is configured to control multiple pieces of equipment. When the equipment controlled by the URC device changes, the URC device may be reprogrammed, for example, to add a new device. The URC device may be programmed using a local transceiver (see FIG. 3) coupled to CPE 122. In some cases, CPE 122 may receive network commands to reprogram the URC device, as will be described in detail below.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a co-axial or IP-based MCDN.

Figure 3:
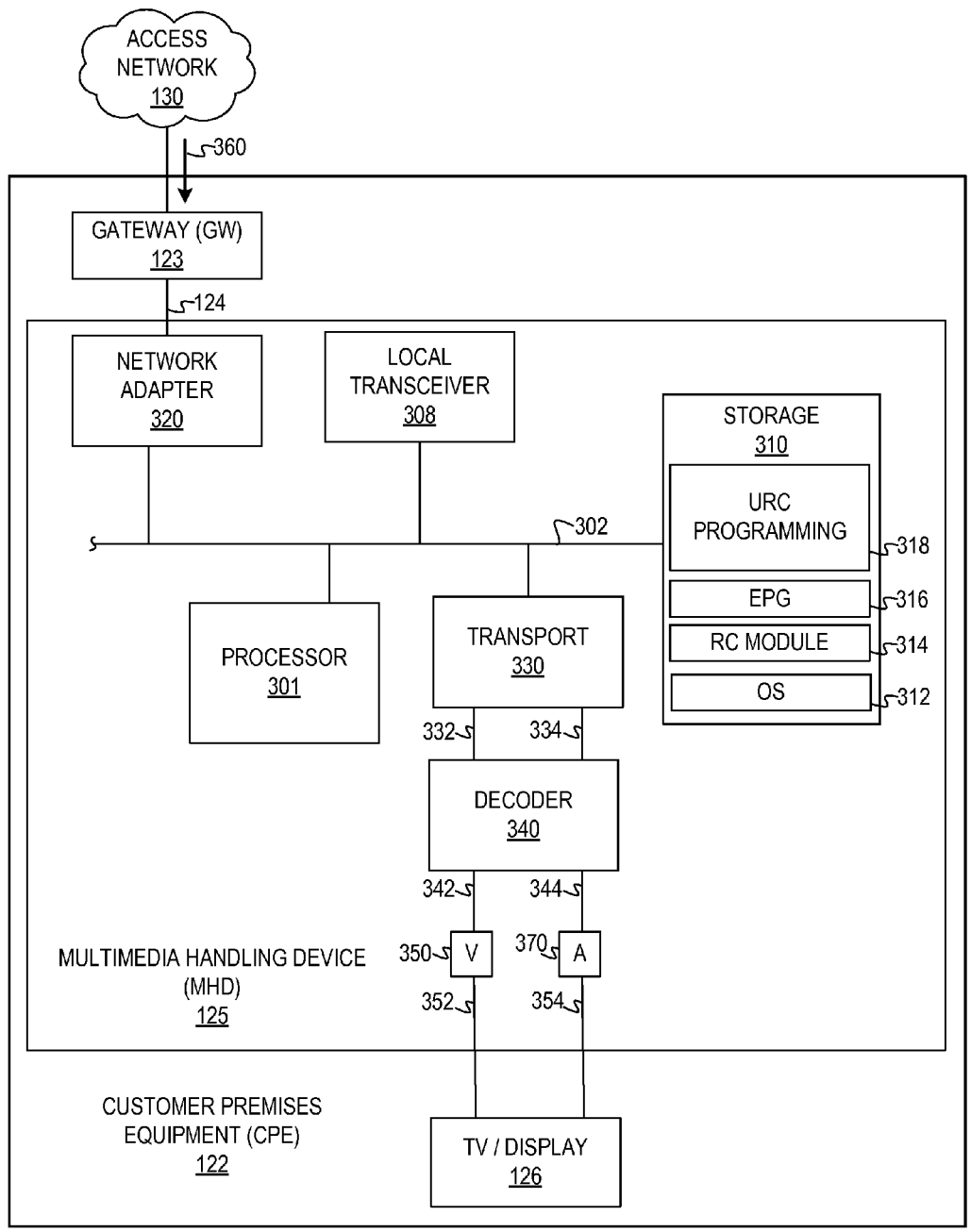
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP based content delivery networks, MHD 125, as depicted in FIG. 3, may include transport unit 330 that assembles the payloads from a sequence or set of network packets into a stream of multimedia content. In coaxial based access networks, content may be delivered as a stream that is not packet based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, and EPG 316, and URC programming 318. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314. In some embodiments, URC application 152 (see FIG. 1), in conjunction with URC programming 318, provides functionality to reprogram or reconfigure a URC device, as will now be described in further detail below.

Local transceiver 308 represents an interface of MHD 125 for communicating with external devices, such as remote control 128, or another URC device. Local transceiver 308 may provide a mechanical interface for coupling to an external device, such as a plug, socket, or other proximal adapter. In some cases, local transceiver 308 is a wireless transceiver, configured to send and receive IR or RF or other signals. A URC device configured to operate with CPE 122 may be reconfigured or reprogrammed using local transceiver 308. In some embodiments, local transceiver 308 is also used to receive commands for controlling equipment from the URC device. Local transceiver 308 may be accessed by RC module 314 for providing remote control functionality.

Figure 4:
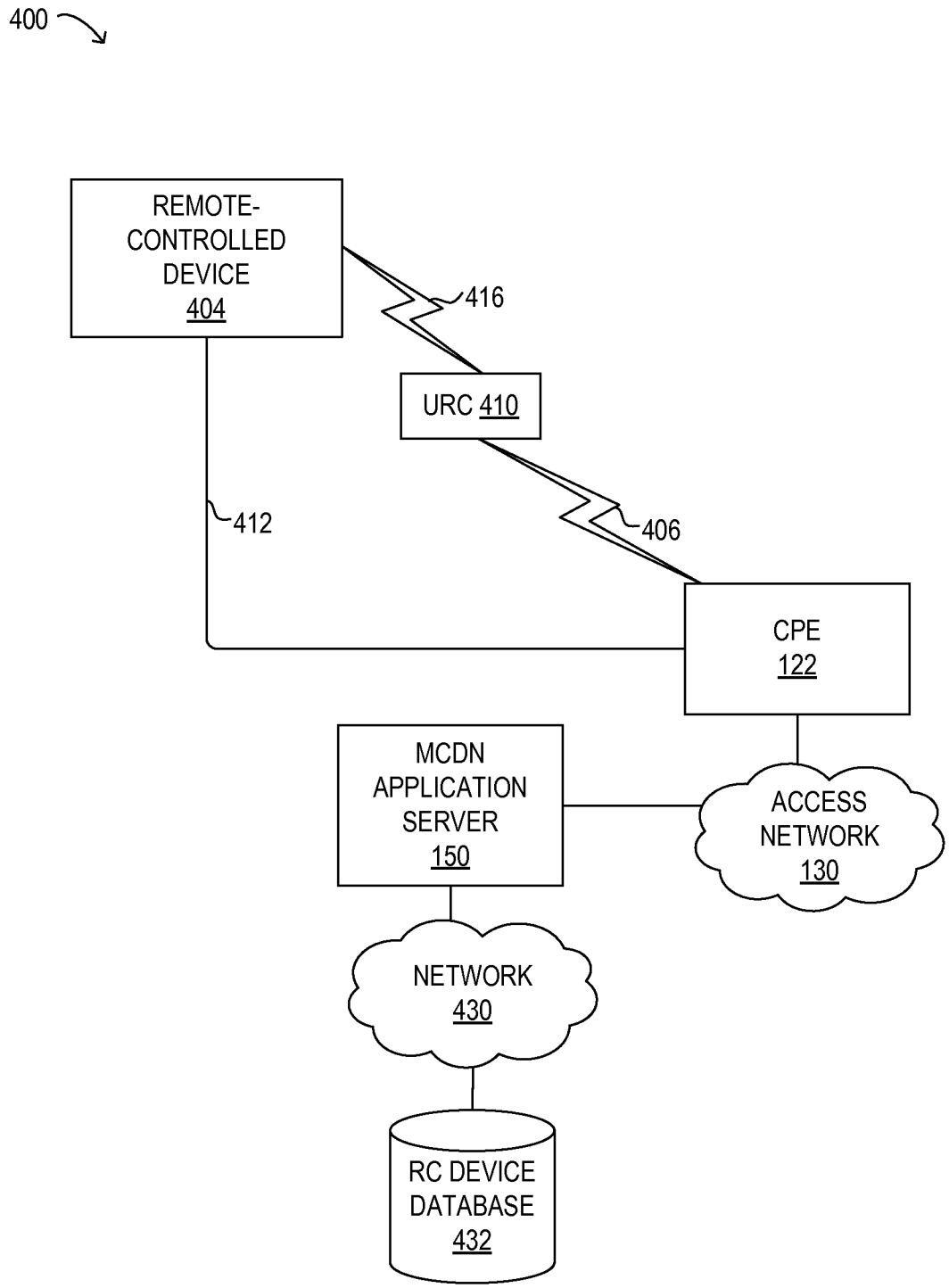
FIG. 4 a block diagram of selected elements of an embodiment of a universal remote control system.

Turning now to FIG. 4, a block diagram of selected elements of an embodiment of URC system 400 is depicted. In URC system 400, URC 410 and CPE 122 may be in proximity to remote-controlled device 404, for example at a location of an MCDN client 120. URC system 400 illustrates devices, interfaces and information that may be processed to program URC 410 to control remote-controlled device 404. The reconfiguring, or reprogramming, of URC 410 may be complex, error prone, or time-consuming for a user. URC system 400 is a platform that may allow a user to reprogram URC 410 using services provided by MCDN 100. It is noted that in FIG. 4, communication links 406 and 416 may be wireless or mechanically connected interfaces. It is further noted that like numbered elements in FIG. 4 represent components discussed above with respect to FIGS. 1-3.

In FIG. 4, remote-controlled device 404 may refer to a piece of equipment that is introduced for use with or near CPE 122. In some embodiments, remote-controlled device 404 may be controllable by remote control, and may be suitable for control by URC 410. Remote-controlled device 404 may also represent an existing instrument or device that is in use, but not yet controllable using URC 410, because URC 410 may not yet be configured to control remote-controlled device 404. Remote-controlled device 404 may further include one or more local transceivers or interfaces (not explicitly shown in FIG. 4) for communicating with remote controls, or for control by another piece of equipment, as will be described below. In certain embodiments, remote-controlled device 404 is delivered with a specific original remote control (not shown in FIG. 4).

In some cases remote-controlled device 404 may be coupled to CPE 122. The coupling to CPE 122 may be subordinate in nature, such that remote-controlled device 404 may be controlled by CPE 122 in response to commands or signals received by local transceiver 308 (see FIG. 3). In URC system 400, CPE 122 is shown with exemplary coupling 412 to remote-controlled device 404. It is noted that coupling 412 is optional and may be omitted in certain embodiments. In certain embodiments, coupling 412 may be a compact digital video and audio interface, and may further include at least one bidirectional control channel. In one particular example, coupling 412 may be a High-Definition Multimedia Interface (HDMI)™ or a substantially similar interface.

In FIG. 4, URC 410 may communicate with CPE 122 via communication link 406. Communication link 406 may be used to receive remote-control commands (i.e., in the form of codes or instructions) from URC 410. Alternatively, communication link 406 may be used to reprogram (i.e., reconfigure) URC 410 to send different commands or to control different equipment. For example, communication link 406 may be used to reconfigure URC 410 to use programming codes corresponding to remote-controlled device 404. In some instances, communication link 406 may be used to limit or delete existing functionality, for which URC 410 may be configured.

In FIG. 4, after URC 410 has been configured with at least some programming codes corresponding to remote-controlled device 404, URC 410 may communicate via communication link 416 with remote-controlled device 404. That is, URC 410 may emulate at least some functionality using communication link 416 that an original remote control is capable of. From the perspective of remote-controlled device 404, communication link 416 may appear identical or indistinguishable to the original remote control. In other words, remote-controlled device 404 may not be aware that URC 410 is emulating the original remote control, and may respond to communication link 416 in an identical manner as with the original remote control.

It is particularly noted that in FIG. 4, two distinct pathways for URC 410 controlling remote-controlled device 404 are depicted in URC system 400. A first pathway is communication link 416, which represents direct control of remote-controlled device 404 by URC 410, without intervention from CPE 122. A second pathway is shown via CPE 122, using communication link 406 and coupling 412, as described above. In this configuration, URC 410 may directly communicate with CPE 122 via communication link 406, for example, using local interface 308 (see FIG. 3). CPE 122 may then relay or forward an instruction received by URC 410 to remote-controlled device 404 using coupling 412. It is noted that in the second pathway, the actual commands transmitted using communication link 406 and/or coupling 412 may be different from each other, and may further be different from actual commands transmitted by communication link 416. In other words, coupling 412 may represent an interface with its own command set, that is different from a standardized command set used for remote control. Further, using the second pathway, CPE 122 may configure URC 410 to transmit a different code using communication link 406 for a given command to control remote-controlled device 404 than what would be expected using the original remote control.

In FIG. 4, CPE 122 may communicate with MCDN application server 150 via access network 130. Access network 130 may represent a "last-mile" access network providing service to a large number of MCDN client systems (see FIGS. 1-3). MCDN application server 150 may, in turn, communicate with external systems using network 430, for example, with RC device database 432. As illustrated in FIG. 4, MCDN application server 150 may retrieve RC device information from RC device database 432 over network 430. Network 430 may be a public or private network, while RC device database 432 may be operated by an external business entity. RC device database 432 may include device information for a variety of different RC devices, which may be controllable by URC 410. The RC device information may include programming codes for specific RC devices. Thus, MCDN application server 150 may query RC device database 432, in one embodiment, using a model identifier to retrieve programming codes for remote-controlled device 404. It is noted that in different embodiments (not shown in FIG. 4) RC device database 432 may be included as an internal component of MCDN application server 150, and may be accessed directly using network 430 or another network In operation of URC system 400, as shown in FIG. 4, remote-controlled device 404 may be connected to CPE 122, such as by coupling 412. In response to establishing the connection, device information may be received from remote-controlled device 404. The device information may be used to program URC 410 via communication link 406 to control remote-controlled device 404. In certain embodiments, the device information may include programming codes for programming URC 410.

In further embodiments, CPE 122 may use the device information, or portions thereof, to query MCDN application server 150 for programming codes of remote-controlled device 404. For this purpose, the device information may include an identifier for remote-controlled device 404 that CPE 122 may use to query MCDN application server 150.

In certain embodiments, CPE 122 may then display, or otherwise send, at least one potential identity for remote-controlled device 404 to a user. The user may then acknowledge and/or confirm the identity. Next, CPE 122 may now use the identity to query MCDN application server 150 for programming codes for remote-controlled device 404. In some instances, MCDN application server 150 may, in turn, obtain the programming codes from RC device database 432, which may be provided by a third-party.

After obtaining or retrieving the desired programming codes, MCDN application server 150, executing URC application 152 (see FIG. 1), may send the programming codes back to CPE 122. CPE 122 may prompt the user to place URC 410 in a location accessible by communication link 406. CPE 122 may then program URC 410 with at least some of the programming codes. CPE 122 may display an indication of being ready to reprogram URC 410 and/or an indication that communication link 406 to URC 404 has been established. In some cases, CPE 122 may wait for user input before proceeding to configure URC 410. Finally, CPE 122 may send or display an acknowledgement to the user that URC 410 has been successfully configured for use with remote-controlled device 404 using communication link 416.

In certain embodiments, CPE 122 may query MCDN application server 150 for programming codes for remote-controlled device 404 that are specific to coupling 412. CPE 122 may then configure URC 410 with programming codes corresponding to at least some of the programming codes for remote-controlled device 404 using communication link 412.

After URC 410 has been programmed, or reprogrammed, CPE 122 may receive a confirmation via communication link 406, and may display an indication that URC 410 has been successfully configured to control remote-controlled device 404. In some cases, CPE 122 may transmit the confirmation/indication of successful URC configuration to MCDN application server 150, which may, in turn, send a confirmation to another device, such as a mobile communications device in possession of the user.

After being successfully configured, URC 410 may control remote-controlled device 404. In one embodiment, URC 410 may use communication link 416 to directly control remote-controlled device 404. In other embodiments, URC 410 may control remote-controlled device 404 by communicating with CPE 122 via communication link 406, and in turn, via coupling 412.

Figure 5:
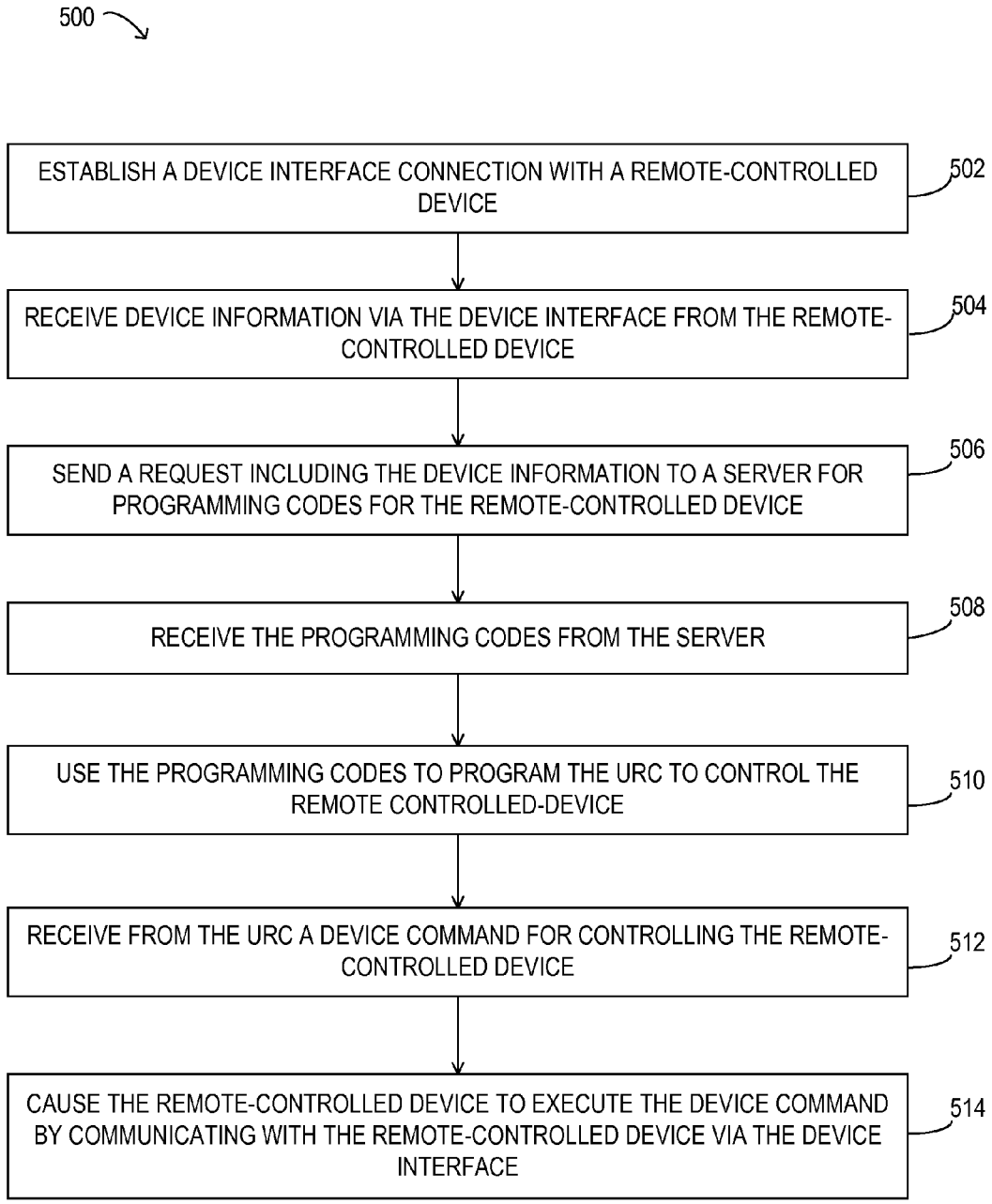
FIG. 5 illustrates an embodiment of a method for programming a universal remote control.

Turning now to FIG. 5, an embodiment of method 500 for programming a URC is illustrated. In one embodiment, method 500 is performed by URC programming 318 executing on MHD 125 of CPE 122. Method 500 may also be performed in conjunction with functionality provided by URC application 152 executing on application server 150. It is noted that certain operations described in method 500 may be optional or may be rearranged in different embodiments. In method 500, it is assumed that remote-controlled device 404 has been introduced alongside CPE 122 of MCDN client 120, and that URC 410 is capable of controlling remote-controlled device 404 (see FIG. 4).

A device interface connection may be established with a remote-controlled device (operation 502). The device interface may be a local bus interface, such as coupling 412 (see FIG. 4). Device information may be received via the device interface from the remote-controlled device (operation 504). The device information may be received in response to establishing the connection in operation 502. A request for programming codes for the remote-controlled device, including the device information, may be sent to a server (operation 506). The device information may include an identifier, such as a model number, a device number, a part number, a serial number, a model name or description, other device information, or a combination thereof. Then, the programming codes may be received from the server (operation 508). The programming codes may be received from an MCDN server via an access network. At least some of the programming codes received from the MCDN server may be used to program the URC. The programming codes may be used to program a URC to control the remote-controlled device (operation 510). In some embodiments, the URC is programmed with codes corresponding to respective programming codes for the remote-controlled device, such that the URC can generate commands associated with the programming codes.

Next, a device command may be received from the URC for controlling the remote-controlled device (operation 512). The remote controlled device may be caused to execute the device command by communicating with the remote-controlled device via the device interface (operation 514). In certain implementations of method 500, the URC may be configured to directly communicate with the remote-controlled device, for example via communication link 416, such that operations 512 and 514 may be omitted.

Figure 6:
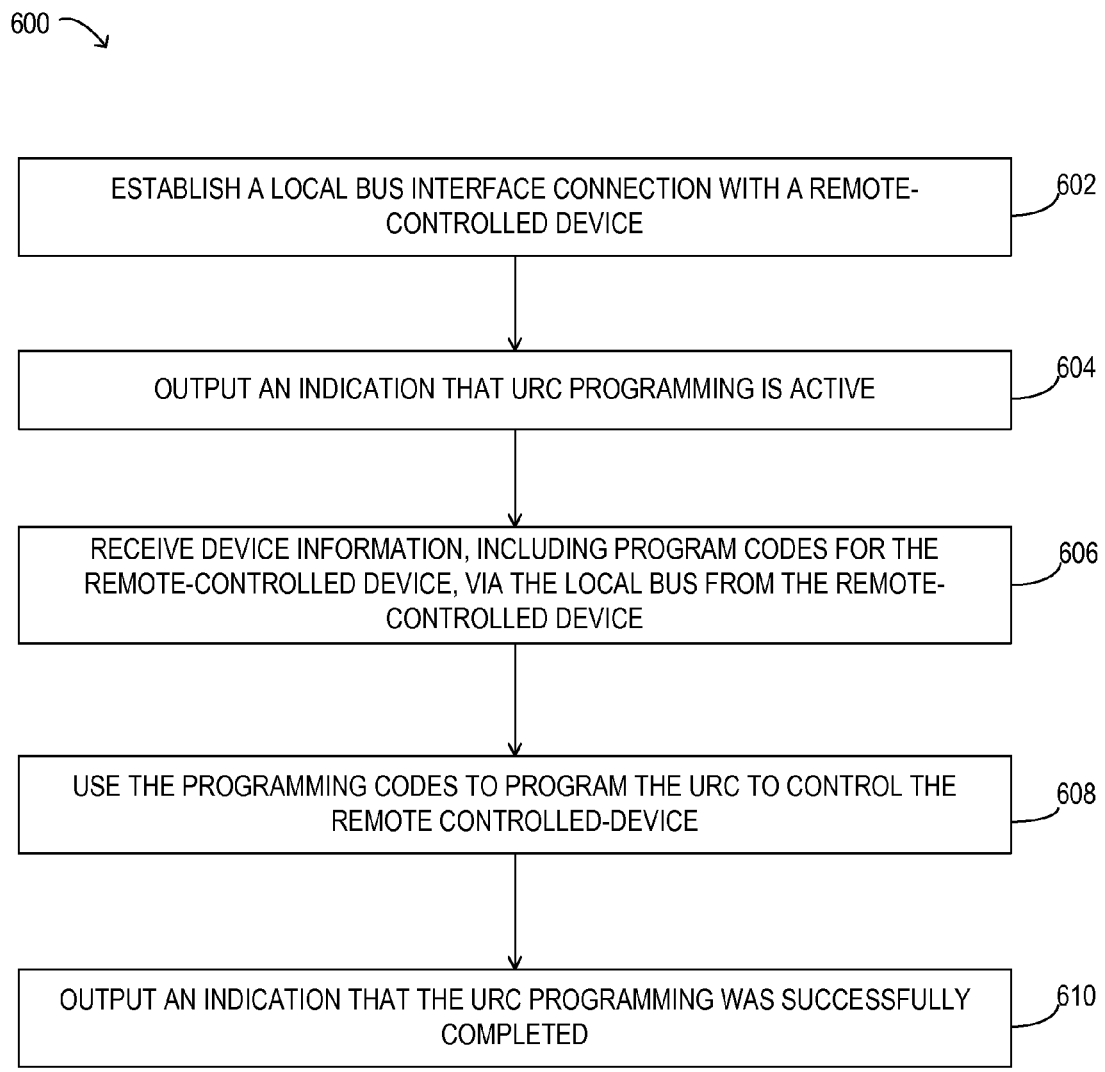
FIG. 6 illustrates an embodiment of a method for programming a universal remote control.

Turning now to FIG. 6, an embodiment of method 600 for programming a URC is illustrated. In one embodiment, method 600 is performed by URC programming 318 executing on MHD 125 of CPE 122. It is noted that certain operations described in method 600 may be optional or may be rearranged in different embodiments. In method 600, it is assumed that remote-controlled device 404 has been introduced alongside CPE 122 of MCDN client 120, and that URC 410 is capable of controlling remote-controlled device 404 (see FIG. 4).

A local bus interface connection may be established with a remote-controlled device (operation 602). Establishing the connection may serve to activate a URC programming mode. An indication that URC programming is active may be output (operation 604). The output may be in the form of a display element, an electronic message, or a hardcopy. Device information, including programming codes for the remote-controlled device, may be received via the local bus interface from the remote-controlled device (operation 606). The programming codes may be used to program the URC to control the remote-controlled device (operation 608). The URC may respond back and send an indication that programming was successful. Then, an indication that URC programming was successfully completed may be output (operation 610). The output may be in the form of a display element, an electronic message, or a hardcopy.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for configuring a universal remote control, the method comprising:
   receiving, by a multimedia handling device, via a local bus interface, device information from a remote-controlled device wherein the device information includes an identifier of the remote-controlled device;
   sending to a server, by the multimedia handling device via an access network interface, a request for programming codes associated with the identifier;
   displaying, by the multimedia handling device, a confirmation indicating that a programming mode for the universal remote control is active;
   programming, based on the programming codes received, the universal remote control via a wireless communication link to control the remote-controlled device.

2. The method of claim 1, wherein:
   the request includes the identifier.

3. The method of claim 1, wherein the local bus interface is a digital audio and video local bus interface.

4. The method of claim 1, further comprising:
   displaying, by the multimedia handling device, a confirmation indicating that the universal remote control has been successfully configured with a programming code for the remote-controlled device.

5. The method of claim 1, further comprising:
   receiving, by the multimedia handling device, a first device command associated with a first device function from the universal remote control via the wireless communication link; and
   sending, by the multimedia handling device via the local bus interface, a second device command associated with the first device function to the remote-controlled device to cause the remote-controlled device to execute the first device function.

6. The method of claim 5, wherein the first device command differs from the second device command.

7. A customer premises equipment device, comprising:
   a processor;
   a wireless transceiver;
   a local device interface including a bidirectional control channel;
   a network adapter; and
   memory media accessible to the processor, including program instructions, that when executed by the processor, cause the processor to perform operations comprising:
   receiving, via the local device interface, device information from a remote-controlled device wherein the device information includes an identifier of the remote-controlled device;
   sending to a server, via the network adapter, a request for programming codes associated with the identifier;
   programming, via the wireless transceiver, a universal remote control, based on the programming codes received, to control the remote-controlled device;
   receiving, from the universal remote control via the wireless transceiver, a first device command associated with a first device function; and
   sending, via the local device interface, a second device command associated with the first device function to the remote-controlled device to cause the remote-controlled device to execute the first device function.

8. The customer premises equipment device of claim 7, wherein the request includes the identifier.

9. The customer premises equipment device of claim 7, wherein the local device interface comprises a digital audio and video local bus interface.

10. The customer premises equipment device of claim 7, wherein the operations include:
    displaying a confirmation indicating that a programming mode for the universal remote control is active.

11. The customer premises equipment device of claim 7, wherein the first device command differs from the second device command.

12. The customer premises equipment device of claim 7, wherein customer premises equipment device comprises a multimedia handling device.

13. The customer premises equipment device of claim 12, wherein the multimedia handling device comprises a set top box.

14. A computer readable memory device, including processor executable program instructions that, when executed by a processor, cause the processor to perform operations comprising:
    receiving, via a local device interface, device information from a remote-controlled device wherein the device information includes an identifier of the remote-controlled device;
    sending to a server, via a network adapter, a request for programming codes associated with the identifier;
    programming, via a wireless transceiver, a universal remote control, based on the programming codes received, to control the remote-controlled device;
    receiving, from the universal remote control via the wireless transceiver, a first device command associated with a first device function; and
    sending, via the local device interface, a second device command associated with the first device function to the remote-controlled device to cause the remote-controlled device to execute the first device function.

15. The computer readable memory device of claim 14, wherein the request includes the identifier.

16. The computer readable memory device of claim 14, wherein the local device interface comprises a digital audio and video local bus interface.

17. The computer readable memory device of claim 14, wherein the operations include:
    displaying a confirmation indicating that a programming mode for the universal remote control is active.

18. The computer readable memory device of claim 14, wherein the first device command differs from the second device command.

* * * * *